United States Patent
Matsui et al.

(10) Patent No.: US 7,088,751 B2
(45) Date of Patent: Aug. 8, 2006

(54) SOLID-STATE LASER APPARATUS

(75) Inventors: Kenichi Matsui, Tokyo (JP); Akihiro Otani, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 125 days.

(21) Appl. No.: 10/432,898

(22) PCT Filed: Mar. 8, 2001

(86) PCT No.: PCT/JP01/01826

§ 371 (c)(1),
(2), (4) Date: Oct. 7, 2003

(87) PCT Pub. No.: WO02/45218

PCT Pub. Date: Jun. 6, 2002

(65) Prior Publication Data

US 2004/0052285 A1    Mar. 18, 2004

(30) Foreign Application Priority Data

Nov. 30, 2000   (JP) ............................. 2000-365148

(51) Int. Cl.
*H01S 3/00*   (2006.01)
*H01L 23/20*   (2006.01)

(52) U.S. Cl. .................. 372/33; 372/59; 257/682
(58) Field of Classification Search .............. 372/39, 372/59, 33; 257/682, 678
See application file for complete search history.

(56) References Cited

U.S. PATENT DOCUMENTS

| 3,326,810 | A | * | 6/1967 | Dolan et al. .................. 252/194 |
| 5,100,635 | A | * | 3/1992 | Krishnamurthy et al. ... 423/235 |
| 5,550,851 | A |   | 8/1996 | Guch, Jr. et al. |
| 5,696,785 | A | * | 12/1997 | Bartholomew et al. ....... 372/59 |
| 6,036,321 | A |   | 3/2000 | Wright et al. |

FOREIGN PATENT DOCUMENTS

| DE | 197 38 121 A1 | 3/1998 |
| DE | 299 01 601 U1 | 6/1999 |
| GB | 437 139 | 10/1935 |
| JP | 2-306675 | 12/1990 |

* cited by examiner

*Primary Examiner*—James Menefee
(74) *Attorney, Agent, or Firm*—Sughrue Mion, PLLC

(57) ABSTRACT

A solid-state laser apparatus includes a cavity 17 for storing a laser diode 40 and a laser medium 6 to be excited by the laser diode 40, and a storage unit 70, for communicating with the cavity 17 and for internally storing a drying agent 71. A moisture permeable film 72 is formed at openings 73 whereat the cavity 17 and the storage unit 70 communicate with each other.

9 Claims, 7 Drawing Sheets

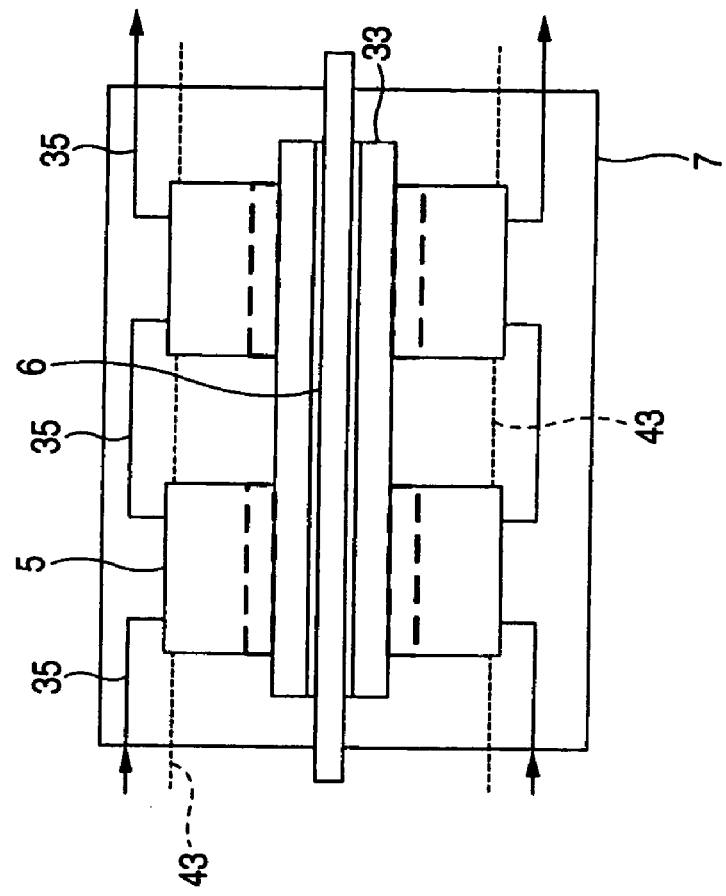
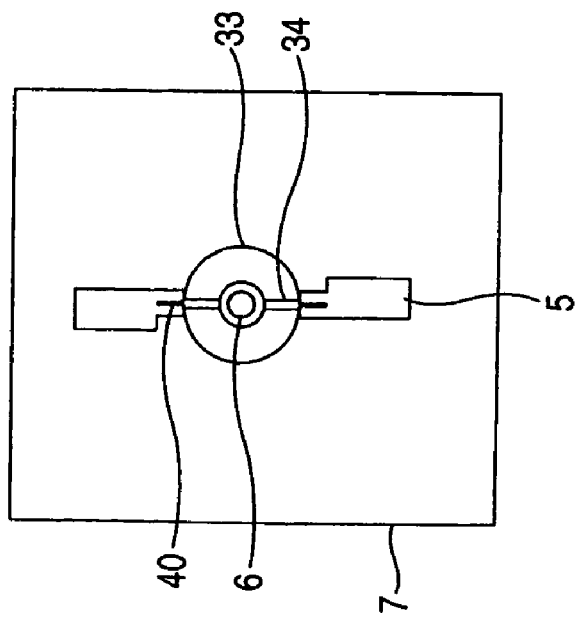

SOLID-STATE LASER APPARATUS

TECHNICAL FIELD

The present invention relates to a solid-state laser apparatus that can prevent the dew condensation inside a case wherein a laser diode and a laser medium are stored.

BACKGROUND ART

A conventional solid-state laser apparatus will be described referring to FIGS. 5 to 7.

FIG. 5 is a schematic diagram showing a conventional solid-state laser apparatus, and the light path of a laser beam emitted by the solid-state laser apparatus.

In FIG. 5, reference number 1 denotes an oscillator head; 2, a resonator; 3, a partial reflector; 4, a full reflector; 5, an LD module, which is an excitation light source; 6, a laser medium, which is an excitation medium; 7, a case (hereinafter, where needed, referred to as a "cavity") in which the LD module 5 and the laser medium 6 are stored; 8, a laser beam emitted by the resonator 2; 9, an expansion lens; 10, a collimating lens; 11, a beam shutter; 20, a condenser lens; 21, a fiber holder; 22, an optical fiber entrance section, formed of the condenser lens 20 and the fiber holder 21; 23, an optical fiber; and 24, a machining head.

The laser oscillation operation will now be described. Inside the resonator 2 in FIG. 5, the laser medium 6 is excited by excitation light emitted by the LD module 5, and laser oscillation is begun using the partial reflector 3 and the full reflector 4, provided so that they sandwich the laser medium 6. The laser beam 8, emitted by the resonator 2, is expanded while passing through the expansion lens 9, and is changed, by passing through the collimating lens 10 and the beam shutter 11, to parallel laser beams 8 that enter the optical fiber entrance section 22.

The parallel laser beams 8 incident to the optical fiber entrance section 22 are condensed by the condenser lens 20 of the optical fiber entrance section 22, and enter an end of the optical fiber 23, held by the fiber holder 21, as a condensed beam that is transmitted inside the optical fiber 23.

The laser beam 8, after passing through the optical fiber 23, is output at the other end of the optical fiber 23, which is connected to the machining head 24, and is used for a machining process.

FIG. 6 is a schematic diagram showing the structure of the cavity 7, and FIG. 7 is a schematic diagram showing the structure of the LD module 5. In FIG. 6, (a) is a front view and (b) is a side view. Reference numeral 33 denotes a condenser formed of a reflecting member; 34, a gap formed in the condenser 33; 35, a pipe; and 36, a pipe joint, through which cooling water, fed by a cooling water supply device (not shown), flows and cools the LD module 5 and the laser medium 6.

Reference numeral 40 denotes a laser diode (hereinafter, when needed, referred to as an "LD") for generating excitation light; and 41 denotes a heat sink for holding and cooling the LD 40. The heat sink 41, to which the pipe joint 36 and wiring line 43a are connected, is designed so that cooling water, supplied by the pipe 35, flows into and through it. An electrode 42, connected to a wiring line 43b, supplies power provided by a laser diode power source (not shown).

Since the characteristic of the LD 40, especially a wavelength important to the YAG excitation, is changed as the temperature of the cooling water, which cools the LD module 5, is adjusted to maintain a constant temperature. For the LD 40, the excitation efficiency is improved as the temperature of the water is reduced; however, while taking into account the dew condensation, which occurs in the cooling system at high temperatures, the temperature set for the water tends to fall within a range of from 20° C. to 25° C.

The operation of the LD module 5 will now be described. When power is supplied by the laser diode power source to the LD 40 through the electrode 42, the LD 40 emits light and also generates heat. The heat that is generated is transmitted to the heat sink 41, and is lowered by the cooling water that flows across the heat sink 41.

The emitted LD light passes through the gap 34 of the condenser 33 in FIG. 6, and is transmitted to the internal cylindrical portion of the condenser 33. Then, the light passes through a flow tube (not shown) and is absorbed by the laser medium 6, and excites the laser medium 6. Subsequently, after the laser medium 6 has been excited, the laser beam is oscillated.

Since upon the absorption of the LD light the laser medium 6 not only begins laser oscillation but also generates heat, the laser medium 6 is cooled by the cooling water that flows between the flow tube and the laser medium 6.

The interior of the cavity 7 constitutes a semi-closed structure for blocking the entry of dust and to thus prevent the dust from being attached to the LD 40. However, the entry into the cavity 7 of water contained in the atmosphere is inevitable. Further, for the solid-state laser apparatus, unlike the case for a gas laser apparatus, it is not always necessary for the cavity 7 to substantially be closed in the vacuum state, and this is not normally performed because of the cost, etc. Therefore, if the ambient atmosphere contains a large amount of water, water gradually enters the cavity 7 that has been assembled. Further, when the cooling water slightly permeates at the cooling water pipe in the cavity 7, the amount of water in the cavity 7 is increased even more.

When the air temperature in the cavity 7 is changed, the relative humidity is changed because the absolute humidity is substantially constant. When the temperature is reduced, the relative humidity is increased, so that when the apparatus is activated at a high temperature or is halted at a low temperature, the dew condensation will occur at the parts surrounding the LD 40, such as at the heat sink 41 and a sub-mounting portion (not shown), and the LD 40.

When the dew condensation occurs at the LD 40, the light emission portion of the LD 40 becomes dirty easily. And as a result, the light emission portion becomes dusty and stained due to the dirt, and the output of the LD 40 is deteriorated or destabilized. Further, the dew condensation at the heat sink 41 and the sub-mounting portion causes corrosion at those locations. Then, within an extended period of time, a saprophagous organism covers the light emission portion of the LD 40, causing the output to be deteriorated, or after this organism has grown, a short-circuit can be caused that disables the emission of light by the LD 40. Accordingly, when the output of the LD 40 is reduced, the laser output of the resonator 2 is reduced.

As is described above, in the conventional solid-state laser apparatus, the dew condensation in the cavity 7 causes not only a reduction in the output and the destabilization of the LD 40, but also a reduction in and the destabilization of the output of the oscillated laser beam. Thus, a problem has arisen in that the dew condensation within the cavity 7, including the LD 40, must be prevented.

DISCLOSURE OF THE INVENTION

To solve the above problem, it is one objective of the present invention to provide a solid-state laser apparatus that can prevent the dew condensation inside a case (a cavity) in which a laser diode and a laser medium are stored.

According to a first invention, a solid-state laser apparatus comprises: a case for storing a laser diode and a laser medium to be excited by the laser diode; and water removal means for removing water from the interior of the case.

According to a second invention, a solid-state laser apparatus comprises: a case for storing a laser diode and a laser medium to be excited by the laser diode; and a storage unit, for communicating with the case and for internally storing a drying agent, wherein a moisture permeable film is formed at the portion whereat the case and the storage unit communicate with each other.

According to a third invention, for a solid-state laser apparatus, silica gel is employed as the drying agent and is provided in a moisture permeable bag.

According to a fourth invention, for a solid-stage laser apparatus, the storage unit communicates with means for supplying drying air.

According to a fifth invention, for a solid-state laser apparatus, an opening/closing lid is provided for the storage unit, and is made of a transparent material.

According to a sixth invention, for a solid-state laser apparatus, the moisture permeable film is formed of a porous film or a lamination of the porous film and a reinforcement material.

BRIEF DESCRIPTION OF THE DRAWINGS

FIG. 6 is a schematic diagram showing the structure of a cavity in the conventional solid-state laser apparatus.

BEST MODES FOR CARRYING OUT THE INVENTION

FIRST EMBODIMENT

The configuration and the operation of a solid-state laser apparatus according to a first embodiment of the present invention will now be described.

Figure 1:
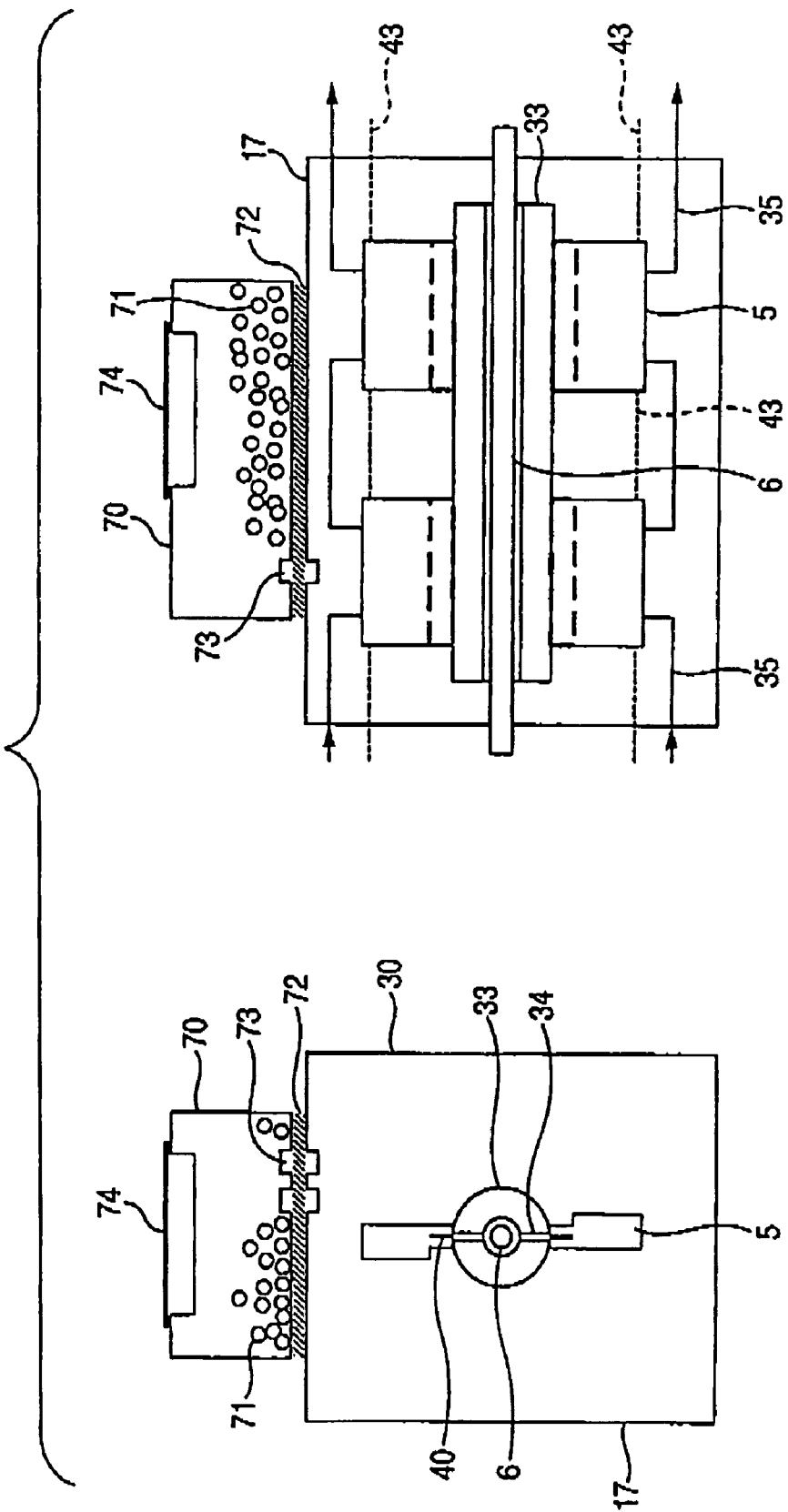
FIG. 1 is a schematic diagram showing the structure of a cavity in a solid-state laser apparatus according to a first embodiment of the present invention.

FIG. 1 is a diagram showing the configuration of a cavity in the solid-state laser apparatus according to the first embodiment of the present invention. Wherein (a) is a front view and (b) is a side view.

In FIG. 1, differences from the conventional apparatus are that a storage unit 70 is provided and communicates, through an opening 73, which is a communication portion, with a cavity 17 where an LD 40 is stored, and that a drying agent 71 is stored in the storage unit 70, and that a moisture permeable film 72 for dust prevention is formed at openings 73 formed between the storage unit 70 and the cavity 17, and that a lid 74 is provided for the storage unit 70 to facilitate the exchange of the drying agent 71. Since the other portions are substantially the same as those for the conventional apparatus, detailed explanation for them will be omitted.

The operation will now be described. In the cavity 17 shown in FIG. 1, the drying agent 71, such as silica gel, stored in the storage unit 70 absorbs water and reduces the humidity therein. When there is a difference in the internal humidity, between the storage unit 70 and the cavity 17, the water is passed through the moisture permeable film 72 and is transmitted to the interior of the storage unit 70, so that the humidity inside the cavity 17 is reduced and the dew condensation in the cavity 17 is prevented.

It should be noted that particles are generated from the drying agent 71 by friction. When these particles enter the cavity 17, they cause contamination of the surface of the LD 40. However, since the moisture permeable, and dust preventing film 72 is formed between the storage unit 70 and the cavity 17, the particles generated in the storage unit 70 will not enter the cavity 17.

Further, the drying agent 71 must be periodically exchanged, and the lid 74 must be opened to release the storage unit 70. At this time, dust in the air may enter the storage unit 70; however, this can be blocked by the film 72, and does not enter the cavity 17.

With the above described configuration, it is possible to provide a reliable solid-state laser apparatus that can prevent contamination due to dust particles, and can reduce the humidity in the cavity 17, wherein the LD 40 is mounted, and can prevent the dew condensation in the LD 40, the reduction of the laser output, and the occurrence of an LD 40 failure.

Figure 2:
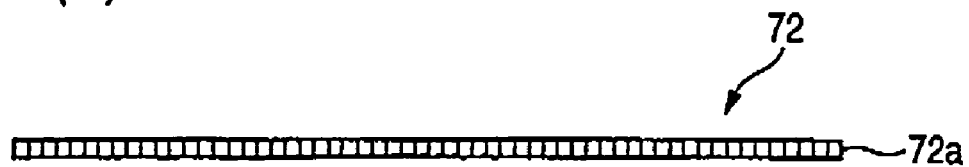
FIG. 2 is a diagram showing a moisture permeable film used for the solid-state laser apparatus according to the first embodiment of the present invention.
Figure 2:
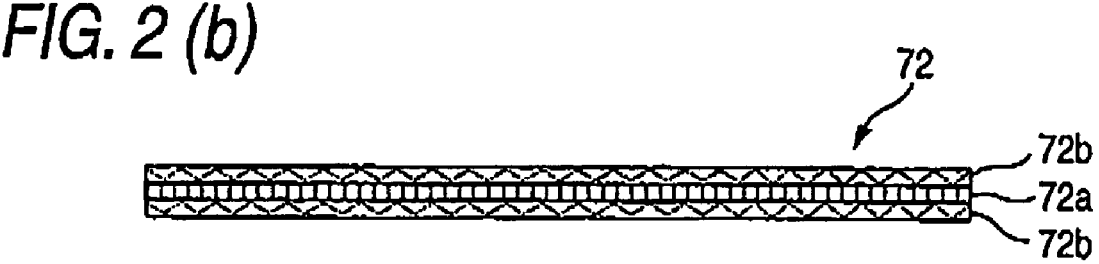
Figure 2:
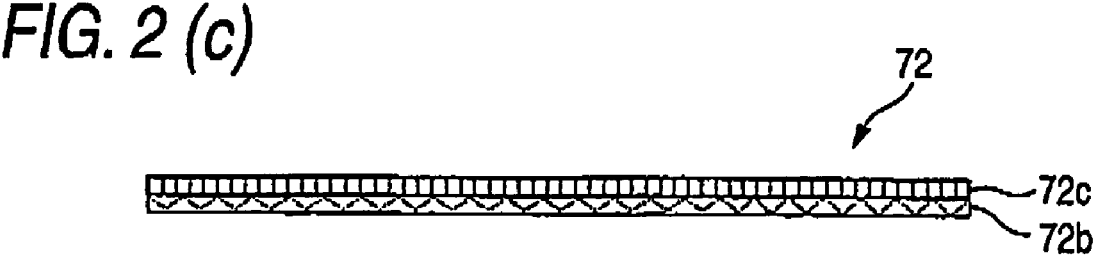

The moisture permeable film 72 used for the solid-state laser apparatus of the invention is shown in FIGS. 2(a), 2(b) and 2(c).

In FIG. 2(a), the moisture permeable film 72 is made of a fluoride resin, for example, which is a porous film 72a such as Goretex, Microtex or Poreflon (product name). The film 72a has vent holes in the sub-micron order, and satisfactorily filters water liquid and solid particles, while permitting water vapor to pass through. Therefore, while maintaining high moisture permeation, the entry of a contaminating material from the storage unit 70 to the cavity 17 can be prevented.

The film 72a is weak because when it is made it is soft and thin, normally 0.5 mm or less, so it can better maintain the moisture permeation function. Therefore, the film 72a itself is not sufficiently strong, and can be torn when the force is applied to it, e.g., when it is erroneously pushed by a tool when the drying agent is being exchanged. Thus, as is shown in FIG. 2(b), a strong non-woven fabric or fabric 72b is laminated on the film 72a, so that a satisfactory strength can be ensured for the entire film 72, and a more reliable film 72 can be formed. Further, as is shown in FIG. 2(c), the film 72 wherein a strong non-woven fabric or fabric 72b is covered with a moisture permeable coating material 72c, such as polyurethane, so that the same effects can be obtained. In FIG. 2(b), the strong non-woven fabric or fabric 72b is laminated on both sides of the film 72; however, this may be laminated only on one side. Further, multiple layers may be laminated or coated.

SECOND EMBODIMENT

Figure 3:
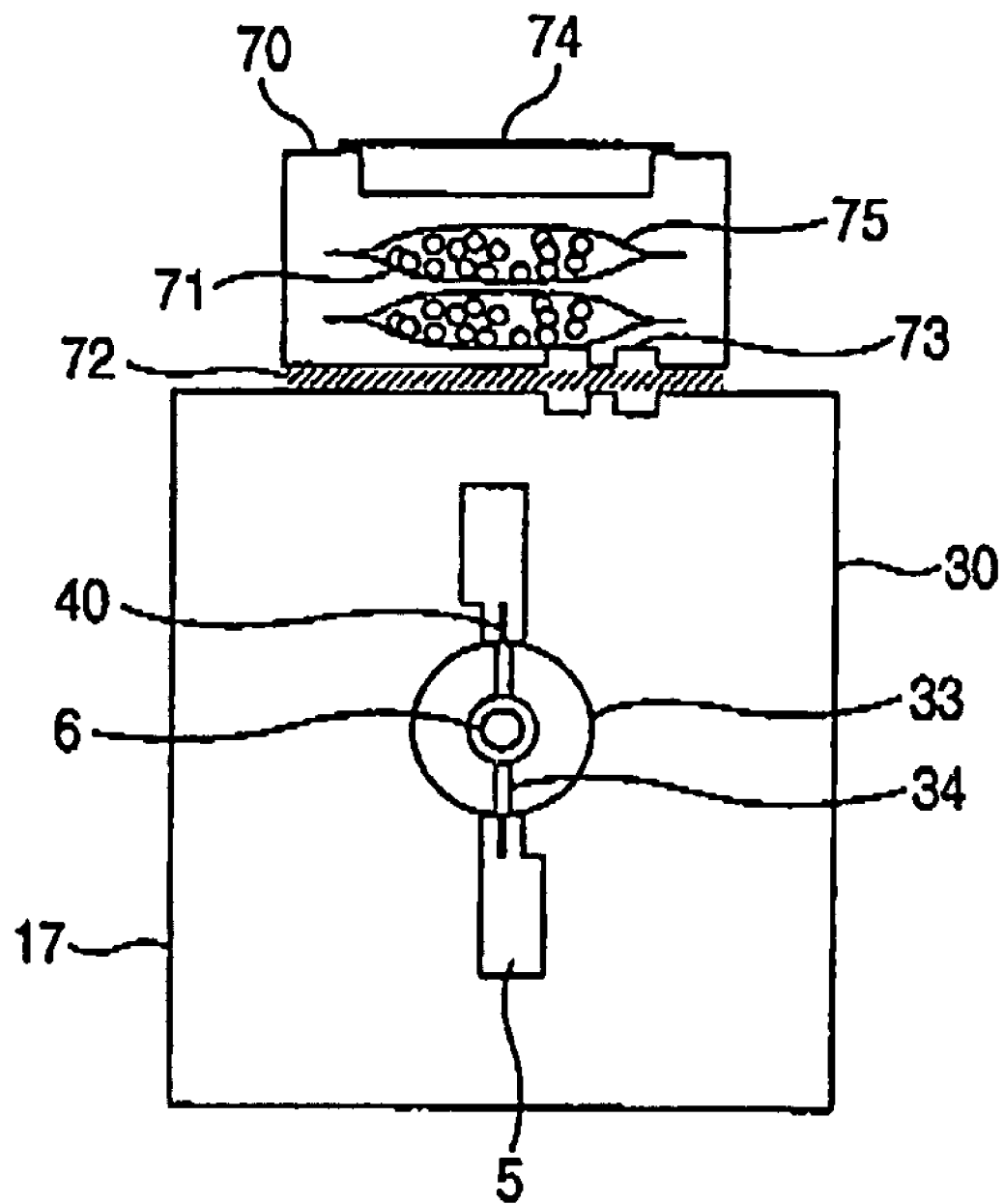
FIG. 3 is a schematic diagram showing the structure of the cavity of a solid-state laser apparatus according to a second embodiment of the present invention.

FIG. 3 is a diagram showing the structure of a cavity for a solid-state laser apparatus according to a second embodiment of the present invention. In FIG. 3, the drying agent is silica gel, and unlike in the first embodiment, is enclosed in a bag 75. Since the bag 75 is made of a moisture permeable material, and can also, to a degree, insure there is no danger that silica gel particles will be scattered, it is easy to handle the drying agent 71 when it is exchanged.

THIRD EMBODIMENT

Figure 4:
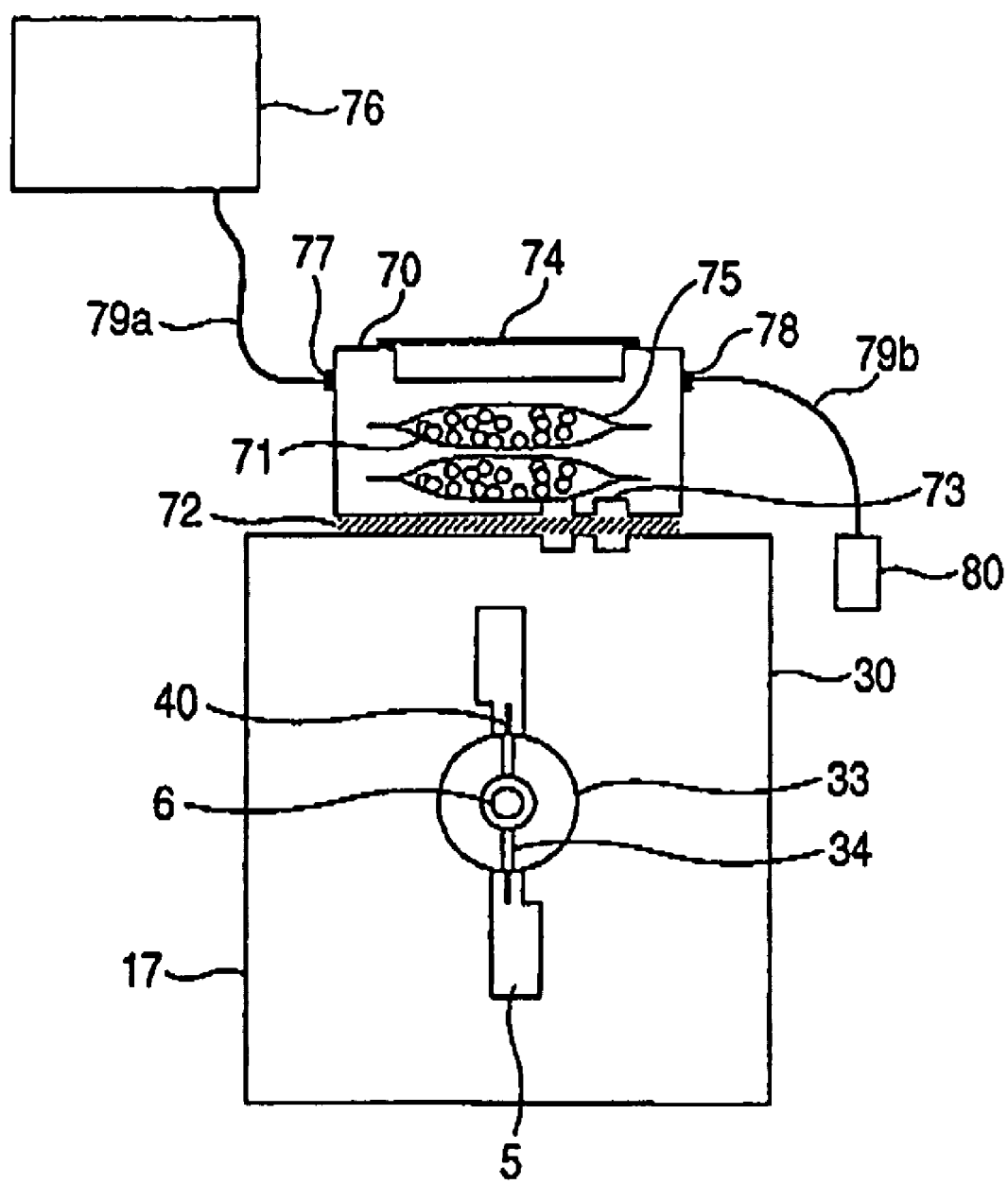
FIG. 4 is schematic diagram showing the structure of the cavity of a solid-state laser apparatus according to a third embodiment of the present invention.
Figure 5:
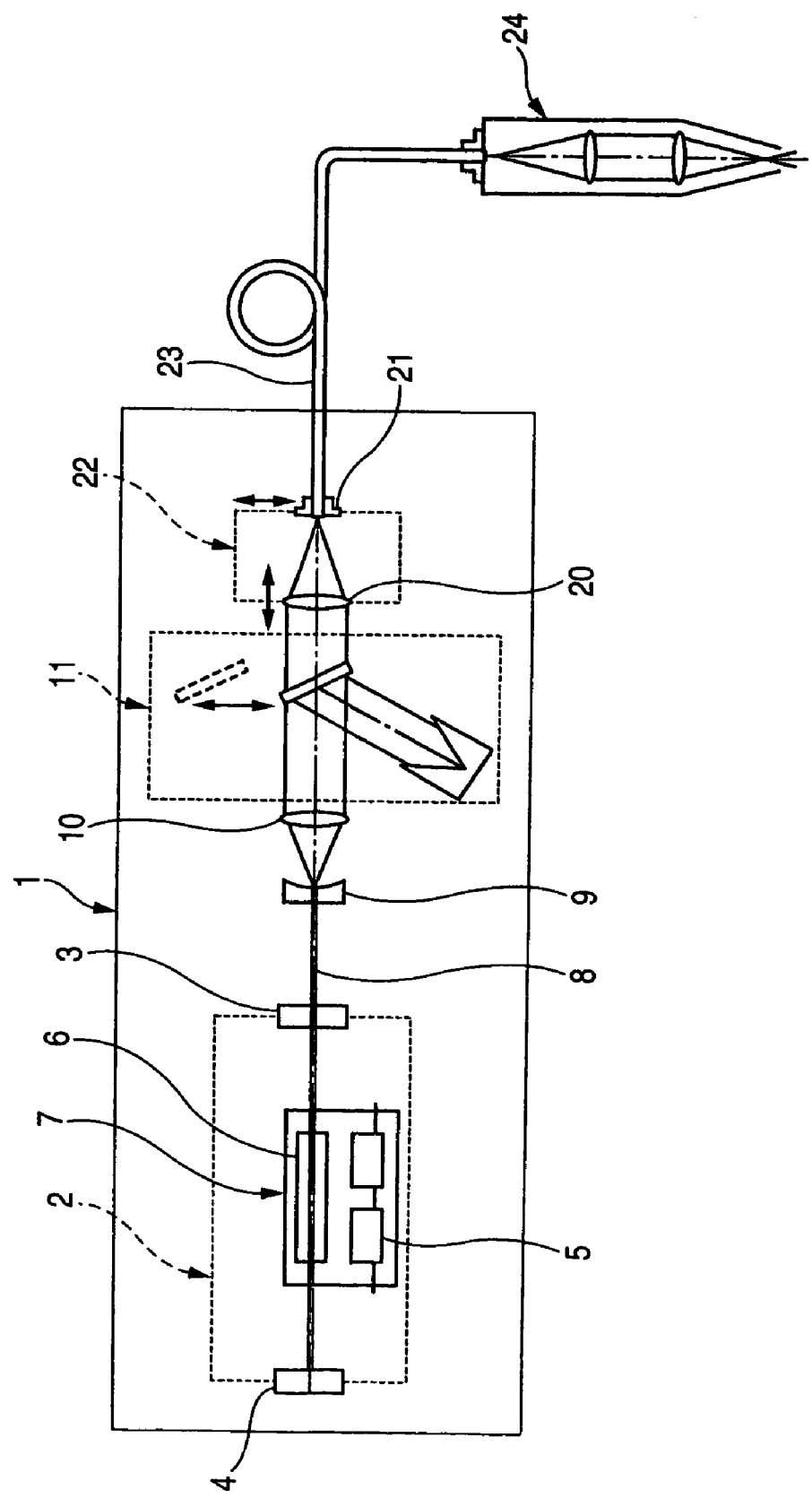
FIG. 5 is schematic diagram showing the structure of the cavity of a conventional solid-state laser apparatus and a laser beam path.
Figure 7:
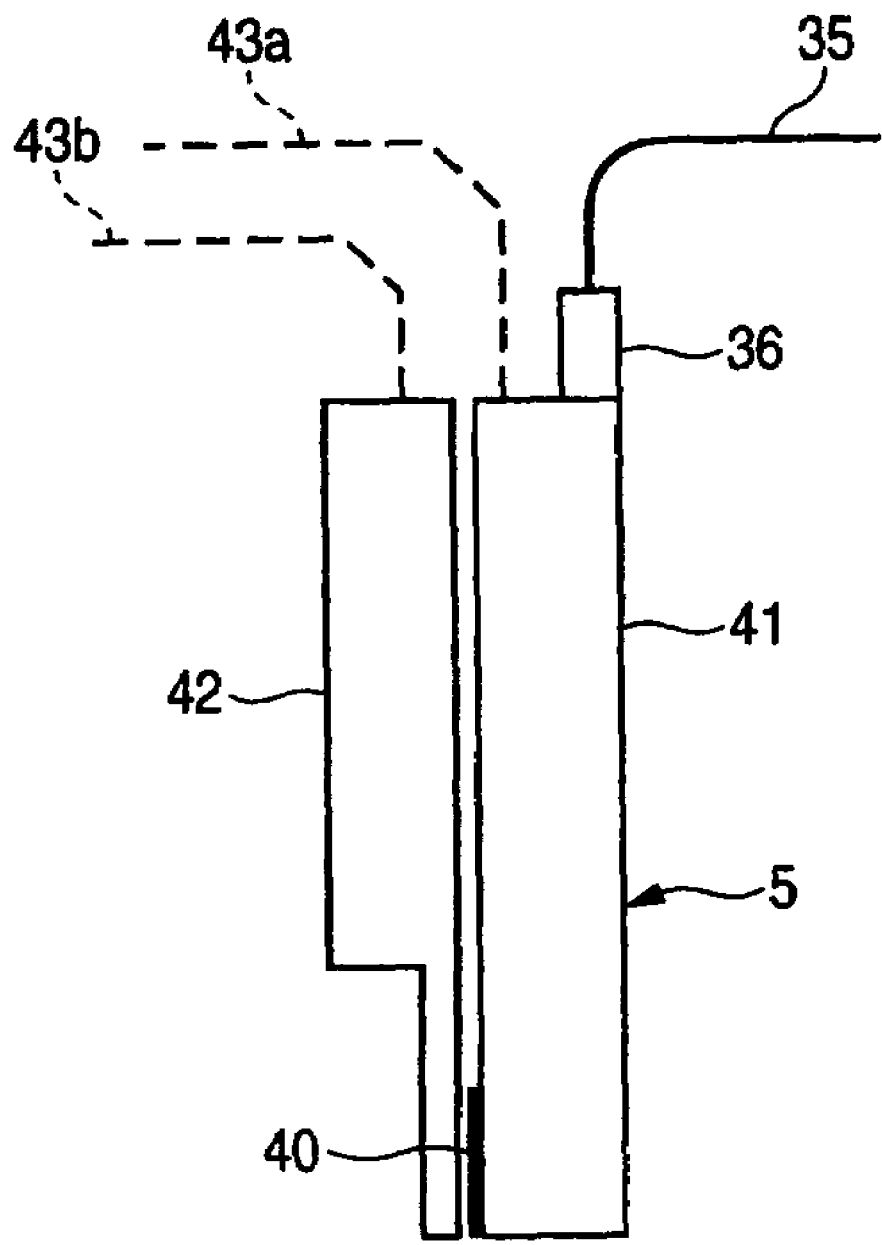
FIG. 7 is a schematic diagram showing the structure of an LD module of a solid-state laser oscillator.

FIG. 4 is a diagram showing the structure of a cavity 17 for a solid-state laser apparatus according to a third embodiment of the present invention. In FIG. 4, a storage unit 70 includes: an air inlet port 77, to which a dry gas, such as a nitrogen, is transmitted from drying gas supplying means 76 along an air inlet pipe 79*a*; and an air exhaust port 78, from which water containing gas discharged by the storage unit 70 is transmitted to an exhaust pipe 79*b*. A backflow prevention valve 80 is provided for the exhaust pipe 79*b*.

A property of the drying agent 71, such as silica gel, is that it absorbs water when the ambient humidity is high, while it discharges absorbed water when the ambient humidity is low. When drying nitrogen gas or drying air is supplied through the air inlet port 77, the humidity inside the storage unit 70 is lowered very far, and the drying agent 71-discharges absorbed water. The discharged water is transmitted, together with the gas from the air exhaust port 78, through the backflow prevention valve 80 to the exterior of the storage unit 70.

With this configuration, when, or before, the drying agent 71 that has absorbed water must be exchanged, the drying gas need only be distributed to recycle the drying agent 71. As a result, the frequency at which the drying agent 71 is exchanged can be reduced.

Furthermore, in each embodiment, the lid 74 of the storage unit 70 maybe formed of a transparent material, thereby enabling the monitoring of the state of the drying agent 71 from outside the storage unit 70.

There is a type of drying agent 71, such as silica gel, that is discolored as it absorbs water, so that depending on the discoloration, the expiration of the service life (the saturated state wherein no water can be absorbed) can be identified. When the lid 74 of the storage unit 70 is made of a transparent material, the color of the drying agent 71 can be observed from outside the cavity 17, without the lid 74 having to be opened, and the exchange time can be determined.

INDUSTRIAL APPLICABILITY

As is described above, the solid-state laser apparatus according to the present invention can prevent the dew condensation inside a case wherein a laser diode and laser material are stored. Therefore, a reliable solid-state laser apparatus can be obtained.

The invention claimed is:

1. A solid-state laser apparatus which emits a laser beam using a resonator, the solid-state laser apparatus comprising:
a case in which a laser diode and a laser medium to be excited by the laser diode are stored; and
a partial reflector and a full reflector, arranged so as to sandwich the laser medium stored in the case,
wherein a storage unit is provided to communicate with the case and to internally store a drying agent, and
wherein a moisture permeable film made of a porous film is formed at the portion whereat the case and the storage unit communicate with each other, the storage unit being disposed completely outside of the case.

2. A solid-state laser apparatus according to claim 1, wherein the moisture permeable film is formed of a lamination of the porous film and a reinforcement material.

3. A solid-state laser apparatus according to claim 2, wherein silica gel is employed as the drying agent and is provided in a moisture permeable bag.

4. A solid-state laser apparatus according to claim 2, wherein the storage unit communicates with means for supplying drying air.

5. A solid-state laser apparatus according to claim 2, wherein an opening/closing lid is provided for the storage unit, and is made of a transparent material.

6. A solid-state laser apparatus according to claim 3, wherein the storage unit communicates with means for supplying drying air.

7. A solid-state laser apparatus according to claim 3, wherein an opening/closing lid is provided for the storage unit, and is made of a transparent material.

8. A solid-state laser apparatus according to claim 4, wherein an opening/closing lid is provided for the storage unit, and is made of a transparent material.

9. A solid-state laser apparatus according to claim 1, wherein the moisture permeable film provides an interface between the storage unit and the case.

* * * * *